United States Patent
Nakamura et al.

(10) Patent No.: US 11,906,387 B2
(45) Date of Patent: Feb. 20, 2024

(54) TEST METHOD AND TEST DEVICE FOR MODE FIELD DIAMETER

(71) Applicant: NIPPON TELEGRAPH AND TELEPHONE CORPORATION, Tokyo (JP)

(72) Inventors: Atsushi Nakamura, Musashino (JP); Daisuke Iida, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 85 days.

(21) Appl. No.: 17/636,930

(22) PCT Filed: Sep. 10, 2019

(86) PCT No.: PCT/JP2019/035539
§ 371 (c)(1),
(2) Date: Feb. 21, 2022

(87) PCT Pub. No.: WO2021/048919
PCT Pub. Date: Mar. 18, 2021

(65) Prior Publication Data
US 2022/0276123 A1  Sep. 1, 2022

(51) Int. Cl.
*G01M 11/02* (2006.01)
*G01M 11/00* (2006.01)

(52) U.S. Cl.
CPC ............ *G01M 11/02* (2013.01); *G01M 11/33* (2013.01)

(58) Field of Classification Search
CPC .... G01M 11/332; G01M 11/02; G01M 11/33; G01N 21/412
See application file for complete search history.

(56) References Cited

U.S. PATENT DOCUMENTS 8,867,028 B2 * 10/2014 Yablon ................. G01M 11/338
356/73.1
9,513,189 B2 * 12/2016 Jiang ..................... G01M 11/33
(Continued)

OTHER PUBLICATIONS

Nishimura et al "Determination Of Spot Size Of Single-mode Optical Fibre By Measuring Far-field Pattern Of Beam Emitted From One End Of Fibre And Using Hankel Transform To Find Near Field Pattern", May 15, 1985, EP141251A (Year: 1985).*

(Continued)

*Primary Examiner* — Sang H Nguyen
(74) *Attorney, Agent, or Firm* — Harness, Dickey & Pierce, P.L.C.

(57) ABSTRACT

The purpose of the present disclosure is to provide a mode field diameter test method and test device that enable acquisition of a mode field diameter for an arbitrary higher-order mode. The present disclosure is a mode field diameter test method including: a test light incidence procedure for selectively causing test light to be incident in a mode subject to measurement, on one end of an optical fiber 10 under test; a far-field pattern measurement procedure for measuring a far-field pattern of the mode subject to measurement, with respect to a divergence angle θ at the other end of the optical fiber under test, by a far-field scanning technique; and a mode field diameter calculation procedure for calculating, using an equation, a mode field diameter from information about incident mode orders in the test light incidence procedure and the far-field pattern measured in the far-field pattern measurement procedure.

3 Claims, 8 Drawing Sheets

(56) References Cited

U.S. PATENT DOCUMENTS

| | | | |
|---|---|---|---|
| 2002/0178757 A1* | 12/2002 | Chinn | G01M 11/334 65/378 |
| 2018/0100782 A1* | 4/2018 | Hayashi | G01M 11/33 |
| 2019/0011623 A1* | 1/2019 | Hayashi | G02B 6/0006 |

OTHER PUBLICATIONS

A. Nakamura et al., "Effective mode field diameter for LP11 mode and its measurement technique", IEEE Photon. Technol. Lett., vol. 28, No. 22, pp. 2553-2556, 2016.

J. D. Love, C.D. Hussey, "Variational approximations for higher-order modes of weakly-guiding fibres", Optical and Quantum Electronics, 16, pp. 41-48, (1984).

T. Hayashi, Y. Tamura, T. Nagashima, K. Yonezawa, T. Taru, K. Igarashi, D. Some, Y. Wakayama, T. Tsuritani, "Effective area measurement of few-mode fiber using far field scan technique with Hankel transform generalized for circularly asymmetric mode", Optics Express, vol. 26, No. 9, pp. 11137-11146, (2018).

International Telecommunication Union, "Definitions and test methods for linear, deterministic attributes of single-mode fibre and cable", Recommendation ITU-T G.650.1, (2018).

K. Petermann, "Microbending Loss in Monomode Fibers", Electronics Letters, vol. 12, No. 4, pp. 107-109, (1976).

K. Petermann, "Constraints For Fundamental-Mode Spot Size For Broadband Dispersion-Compensated Single-Mode Fibers", Electronics Letters, vol. 19, No. 18, pp. 712-714, (1983).

\* cited by examiner

MODE FIELD DIAMETER

|      | REFERENCE | EQUATION (13) | EQUATION (14) | EQUATION (9) |
|------|-----------|---------------|---------------|--------------|
| LP01 | 12.494    | 12.494        | 12.494        | 12.491       |
| LP11 | 12.500    | 12.500        | 12.511        | 12.500       |
| LP21 | 12.490    | 12.492        | 12.470        | 12.490       |
| LP02 | 12.484    | 12.480        | 12.478        | 12.474       |

MODE FIELD DIAMETER

|      | REFERENCE | EQUATION (9) |
|------|-----------|--------------|
| LP01 | 8.294     | 8.24         |
| LP11 | 8.56      | 8.57         |

TEST METHOD AND TEST DEVICE FOR MODE FIELD DIAMETER

CROSS-REFERENCE TO RELATED APPLICATIONS

This application is a 371 U.S. National Phase of International Application No. PCT/JP2019/035539 filed on Sep. 10, 2019. The entire disclosure of the above application is incorporated herein by reference.

TECHNICAL FIELD

The present disclosure relates to a test method and a test device for a mode field diameter of an optical fiber capable of propagating a plurality of modes.

BACKGROUND ART

With an increase of large-volume content represented by videos and games and the spread of smartphones, the amount of traffic over optical fiber networks is increasing year by year. On the other hand, a single-mode fiber that is currently used as a transmission medium is approaching the limit of transmission capacity. As one of technologies to cope with a future traffic increase, mode-multiplexing transmission using few-mode fibers is drawing attention. In this technology, the difference in loss and crosstalk between modes at the splice of few-mode fibers are important optical characteristics.

The splice loss of optical fibers is closely related to an electric field distribution of a mode propagating in the optical fiber. A mode field diameter (MFD) is a parameter representing the spread of the electric field of the fundamental mode (LP01 mode), which enables estimation of the splice loss, and is therefore one of important parameters for understanding the transmission characteristics of a conventional single-mode fiber. On the other hand, since a few-mode fiber is capable of propagating a plurality of modes, it is necessary to have the MFD which enables estimation of the splice loss of each propagable mode, such as the first higher-order mode (LP11 mode), in addition to the LP01 mode.

Non-Patent Literature 1 discloses that a spot size at the beam waist (hereinafter just referred to as the "spot size") when the electric field distribution of a higher-order mode is approximated by a higher-order Gaussian mode (Hermitian Gaussian or Laguerre Gaussian) is promising as the MFD which enables estimation of the loss and inter-mode crosstalk occurring at the splice of few-mode fibers.

As a method for measuring the MFD, Non-Patent Literature 1 discloses a method in which a specific mode is selectively excited in an optical fiber under test, and the MFD is calculated from the effective cross-sectional area of light emitted from a far end and an OTDR waveform. However, although a method for calculating the MFD of the first higher-order mode is clarified, a method for calculating the MFD of further higher-order modes is not mentioned. Therefore, there is a problem, namely, a test method and a device configuration for measuring the mode field diameter, which is defined as the spot size, of further higher-order modes than the first higher-order mode are unknown.

CITATION LIST

Non-Patent Literatures

Non-Patent Literature 1: A. Nakamura et al., "Effective mode field diameter for LP11 mode and its measurement technique", IEEE Photon. Technol. Lett., vol. 28, no. 22, pp. 2553-2556, 2016.

Non-Patent Literature 2: J. D. Love, C. D. Hussey, "Variational approximations for higher-order modes of weakly-guiding fibres", Optical and Quantum Electronics, 16, pp. 41-48 (1984).

Non-Patent Literature 3: T. Hayashi, Y. Tamura, T. Nagashima, K. Yonezawa, T. Taru, K. Igarashi, D. Some, Y. Wakayama, T. Tsuritani, "Effective area measurement of few-mode fiber using far field scan technique with Hankel transform generalized for circularly asymmetric mode", Optics Express, Vol. 26, No. 9, pp. 11137-11146 (2018).

Non-Patent Literature 4: International Telecommunication Union, "Definitions and test methods for linear, deterministic attributes of single-mode fibre and cable", Recommendation ITU-T G.650.1 (2018).

Non-Patent Literature 5: K. Petermann, "Microbending Loss in Monomode Fibers", Electronics Letters, Vol. 12, No. 4, pp. 107-109 (1976).

Non-Patent Literature 6: K. Petermann, "Constraints For Fundamental-Mode Spot Size For Broadband Dispersion-Compensated Single-Mode Fibers", Electronics Letters, Vol. 19, No. 18, pp. 712-714 (1983).

SUMMARY OF THE INVENTION

Technical Problem

The present disclosure has been made in view of the above circumstances, and aims at providing a mode field diameter test method and a mode field diameter test device that enable acquisition of a mode field diameter for an arbitrary higher-order mode.

Means for Solving the Problem

In order to acquire a mode field diameter for an arbitrary higher-order mode, a mode field diameter test method and a mode field diameter test device of the present disclosure cause test light having mode orders subject to measurement to be incident on one end of an optical fiber under test, measures a far-field pattern of the mode subject to measurement, with respect to a divergence angle θ at the other end of the optical fiber under test, by a far-field scanning technique, and calculates the mode field diameter using the incident mode orders and the measured far-field pattern.

More specifically, the mode field diameter test method according to the present disclosure is a mode field diameter test method for measuring a mode field diameter of an arbitrary mode in an optical fiber capable of propagating a plurality of modes, and includes:

a test light incidence procedure for selectively causing test light to be incident in a mode subject to measurement, on one end of an optical fiber under test;

a far-field pattern measurement procedure for measuring a far-field pattern of the mode subject to measurement, with respect to a divergence angle θ at the other end of the optical fiber under test, by a far-field scanning (FFS) technique; and a mode field diameter calculation procedure for calculating, using Equation 1 below, the mode field diameter from the far-field pattern measured in the far-field pattern measurement procedure, or a mode field diameter calculation procedure for calculating the mode field diameter using an electric field distribution in a near field calculated from the far-field pattern, and Equation 2 or 3 below.

[Math. 1]

$$MFD = \sqrt{v+2\mu-1}\frac{\lambda}{\pi}\sqrt{2\frac{\int_0^{\pi/2}|F_{v\mu}(\theta)|^2\sin\theta\cos\theta d\theta}{\int_0^{\pi/2}|F_{v\mu}(\theta)|^2\sin^3\theta\cos\theta d\theta}} \quad (1)$$

where ν and μ are a mode order in a circumferential direction and a mode order in a radial direction of the mode subject to measurement, $F_{v\mu}(\theta)$ is an electric field distribution of an $LP_{v\mu}$ mode in a far field, and $|F_{v\mu}(\theta)|^2$ is the far-field pattern.

[Math. 2]

$$MFD = \frac{2\sqrt{2}}{\sqrt{v+2\mu-1}}\left[\frac{\int_0^\infty E_{v\mu}^2(r)r^3 dr}{\int_0^\infty E_{v\mu}^2(r)r dr}\right]^{1/2} \quad (2)$$

[Math. 3]

$$MFD = 2\sqrt{2(2\mu-1)}\left[\frac{\int_0^\infty E_{v\mu}^2(r)r dr}{\int_0^\infty \left\{\frac{dE_{v\mu}(r)}{dr}\right\}^2 r dr}\right]^{1/2} \quad (3)$$

where ν is the order in a circumferential direction, μ is the order in a radial direction, r is a radial coordinate in a cross section of the optical fiber, and $E_{v\mu}(r)$ is the electric field distribution of the $LP_{v\mu}$ mode in the near field.

The mode field diameter test device according to the present disclosure is a mode field diameter test device for measuring a mode field diameter of an arbitrary mode in an optical fiber capable of propagating a plurality of modes, and includes:

test light incidence means for selectively causing test light to be incident in a mode subject to measurement, on one end of an optical fiber under test;
far-field pattern measurement means for measuring a far-field pattern of the mode subject to measurement, with respect to a divergence angle θ at the other end of the optical fiber under test, by a far-field scanning (FFS) technique; and
mode field diameter calculation means for calculating, using Equation 1, the mode field diameter from information about incident mode orders in the optical fiber under test by the test light incidence means and the far-field pattern measured by the far-field pattern measurement procedure, or mode field diameter calculation means for calculating the mode field diameter from an electric field distribution in a near field calculated from the far-field pattern, and Equation 2 or 3.

Effects of the Invention

The present disclosure can provide a mode field diameter test method and a mode field diameter test device that enable acquisition of a mode field diameter, which is defined as a spot size at the beam waist when an electric field distribution of an arbitrary higher-order mode is approximated by a higher-order Gaussian mode, with a high dynamic range and high resolution.

DESCRIPTION OF EMBODIMENTS

Hereinafter, embodiments of the present disclosure will be described in detail with reference to the drawings. The present disclosure is not limited to the following embodiments. These embodiments are merely examples, and the present disclosure can be implemented in various forms modified and improved based on the knowledge of those skilled in the art. In the present description and drawings, components labeled with the same reference signs mutually represent the same components.

Figure 1:
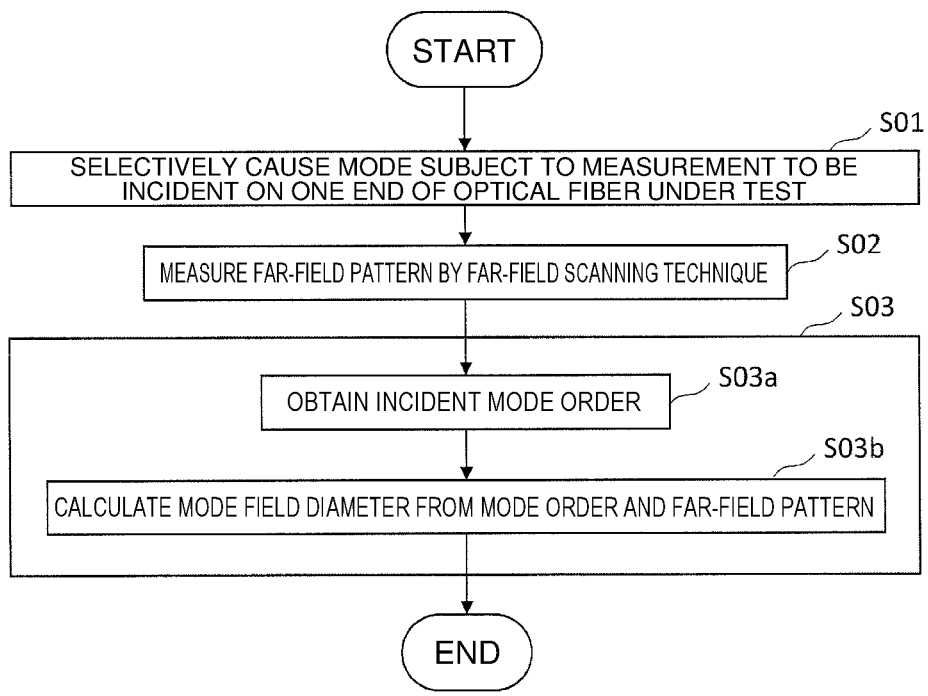
FIG. 1 is a diagram explaining a mode field diameter test method according to the present disclosure.

FIG. 1 is a process diagram explaining a mode field diameter test method according to the present embodiment. The mode field diameter test method includes:

a test light incidence procedure S01 for selectively causing test light to be incident in a mode subject to measurement, on one end of an optical fiber under test;
a far-field pattern measurement procedure S02 for measuring a far-field pattern of the mode subject to measurement, with respect to a divergence angle θ at the other end of the optical fiber under test, by a far-field scanning (FFS) technique; and
a mode field diameter calculation procedure S03 for calculating a mode field diameter, by Equation (1), from the far-field pattern measured in the far-field pattern measurement procedure.

The incidence procedure S01 includes performing:
a generation step (S01a) for generating test light having a desired wavelength;
a mode conversion step (S01b) for converting the test light generated in the generation step into a mode subject to measurement; and
an incidence step (S01c) for causing the test light, which was converted into the mode subject to measurement in the mode conversion step, to be incident on one end of the optical fiber under test.

The measurement procedure S02 includes performing a step for measuring far-field intensity of the test light emitted from the far end of the optical fiber under test with respect to the divergence angle θ, and measuring a far-field intensity distribution of the mode subject to measurement.

The mode field diameter calculation procedure S03 includes performing:
a mode order acquisition step (S03a) for acquiring orders in a circumferential direction and in a radial direction of the mode incident on the optical fiber under test in the incidence procedure; and
a step (S03b) for acquiring the mode field diameter from the mode orders being incident on the optical fiber under test in the incidence procedure, and the intensity distribution measured in the measurement procedure.

The details of the calculation of the mode field diameter will be described later.

Figure 2:
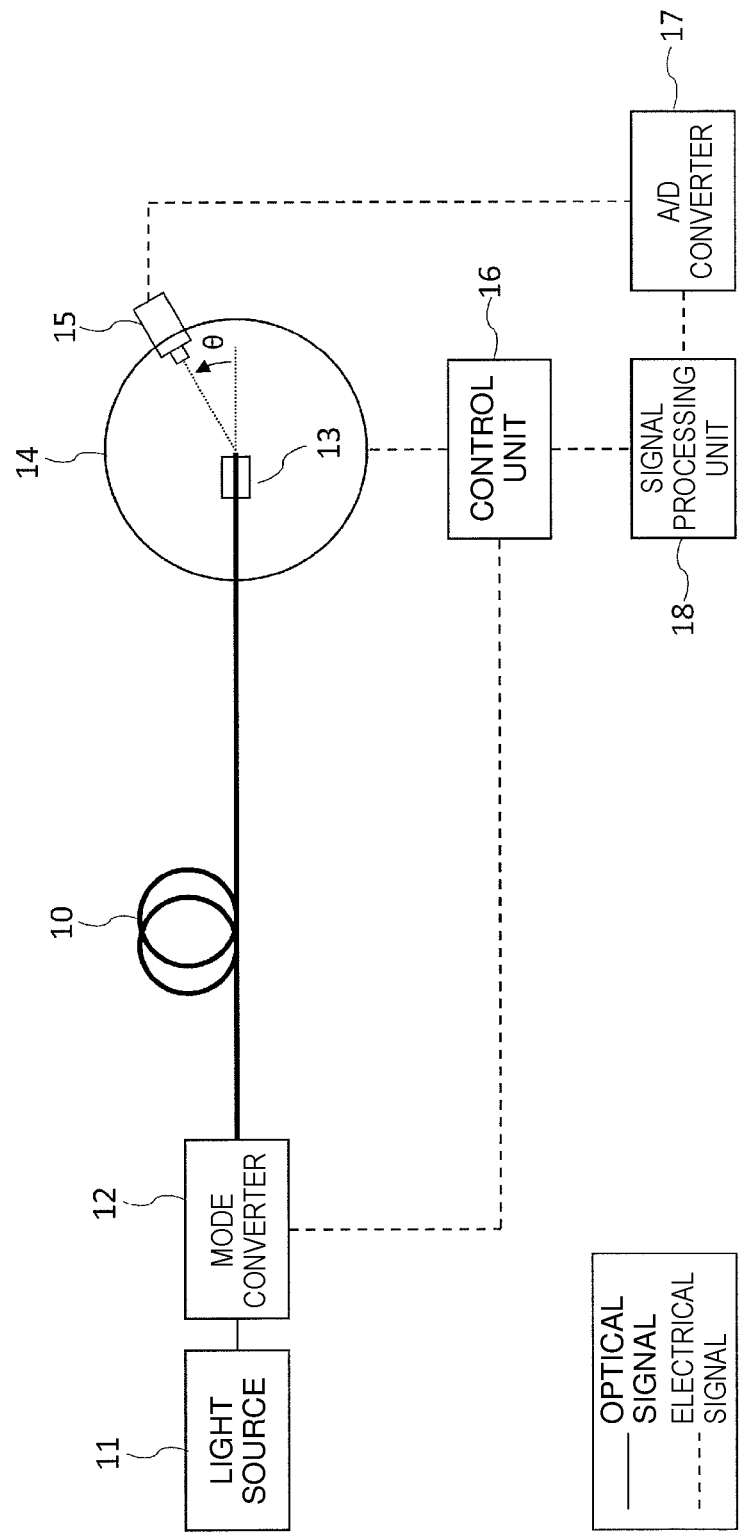
FIG. 2 is a diagram explaining a mode field diameter test device according to the present disclosure.

FIG. 2 is a diagram explaining a configuration example of a mode field diameter test device according to the present embodiment. The mode field diameter test device includes:

test light incidence means for selectively causing test light to be incident in a mode subject to measurement, on one end of an optical fiber under test;

far-field pattern measurement means for measuring a far-field pattern of the mode subject to measurement, with respect to a divergence angle θ at the other end of the optical fiber under test, by a far-field scanning (FFS) technique; and arithmetic operation means for calculating a mode field diameter by substituting information about the mode orders being incident on the optical fiber under test by the test light incidence means and the far-field pattern measured by the far-field pattern measurement means into Equation (1).

The test light incidence means includes a light source 11, and a mode converter 12.

The test light output from the light source 11 is converted into a mode subject to measurement by the mode converter 12, and is then made incident on an optical fiber 10 under test. For the light source 11, any light generating means capable of generating test light having a desired wavelength can be used, and examples are a fiber laser and a semiconductor laser diode. For the mode converter 12, any means capable of converting the mode of the test light can be used, and an example is a mode multiplexer including a directional coupler composed of a planar light wave circuit as described in Non-Patent Literature 1.

The far-field pattern measurement means includes an alignment device 13, a rotation stage 14, an optical receiver 15, a control unit 16, and an A/D (analog/digital) converter 17.

The test light emitted from the far end of the optical fiber 10 under test is incident on the optical receiver 15 disposed on the rotation stage 14, and is photoelectrically converted. An electrical signal from the optical receiver 15 is converted into digital data by the A/D converter 17. At this time, by rotating the position of the optical receiver 15 around the position of the test light emission end of the optical fiber 10 under test with the use of the rotation stage 14, the far-field intensity distribution (far-field pattern) of the mode subject to measurement with respect to the emission angle is obtained. The alignment device 13 can be used to locate the position of the test light emission end of the optical fiber 10 under test, at the center of the rotation stage 14. The control unit 16 can be used for controlling the rotation angle of the rotation stage 14, that is, the position of the optical receiver 15.

The control unit 16 may output, to the mode converter 12, a signal for controlling an incident mode on the optical fiber 10 under test.

The arithmetic operation means includes a signal processing unit 18.

The signal processing unit 18 acquires the orders in the circumferential direction and in the radial direction of the mode subject to measurement from the mode converter 12 or the control unit 16. The signal processing unit 18 performs arithmetic processing for calculating the mode field diameter from the obtained mode orders and the measured far-field pattern.

The control unit 16 and the signal processing unit 18 can also be realized by a computer and a program, and the program can be recorded in a recoding medium or provided through a network.

Hereinafter, the arithmetic processing for calculating the mode field diameter will be described.

With separation of variables in the radial direction and the circumferential direction, the electric field distribution of an arbitrary linearly polarized (LP) mode in an optical fiber can be expressed by the following equation.

[Math. 4]

$$E_{\nu\mu}(r, \phi) = E_{\nu\mu}(r) \begin{Bmatrix} \cos(\nu\phi) \\ \sin(\nu\phi) \end{Bmatrix} \quad (4)$$

where $E_{\nu\mu}$ represents an electric field distribution in a near field of the LP mode where ν is the order in the circumferential direction and μ is the order in the radial direction, that is, the $LP_{\nu\mu}$ mode. The parameters r and φ represent the radial coordinate and the azimuth, respectively, in a cross section of the optical fiber.

Here, a radial electric field distribution $E_{\nu\mu}(r)$ is approximated by the following equation using the associated Laguerre polynomials (see, for example, Equation (9) in Non-Patent Literature 2).

[Math. 5]

$$E_{\nu\mu}(r) = \sqrt{\frac{2(\mu-1)!}{\pi(\nu+\mu-1)!}} \left(\frac{\sqrt{2}\,r}{w}\right)^{\nu} \frac{1}{w} L_{\mu-1}^{\nu}\left(\frac{2r^2}{w^2}\right) \exp\left(-\frac{r^2}{w^2}\right) \quad (5)$$

Here, 2w represents the mode field diameter that is defined as the spot size when the electric field distribution in the optical fiber is approximated by a higher-order Gaussian mode.

$$L_{\mu-1}^{\nu}(x) \quad \text{[Math. 5-1]}$$

is an associated Laguerre polynomial, and is expressed by the following equation.

[Math. 6]

$$L_{\mu-1}^{\nu}(x) = \sum_{k=0}^{\nu} (-1)^k \frac{(\nu+\mu-1)!}{k!(\nu-k)!(k+\mu-1)!} x^k \quad (6)$$

At this time, an electric field distribution in a far field $F_{\nu\mu}(\theta)$ can be expressed by the following equation (see, for example, Equation (6) in Non-Patent Literature 3).

[Math. 7]

$$F_{\nu\mu}(\theta) = \int_0^\infty E_{\nu\mu}(r) J_\nu(kr\sin\theta) r\, dr \quad (7)$$

where θ represents the divergence angle from the near field to the far field, k is the wave number of light in a vacuum, and $J_\nu$ is the first-class Bessel function of order ν.

Here, by substituting Equations (5) and (7) into an equation of a mode field diameter defined by the second-order moment of the far-field pattern used conventionally for calculating the mode field diameter of a single-mode fiber (see, for example, Equation (3-2) in Non-Patent Document 4), the following relational equation is obtained.

[Math. 8]

$$\frac{\lambda}{\pi}\sqrt{2\frac{\int_0^{\pi/2}|F_{\nu\mu}(\theta)|^2\sin\theta\cos\theta d\theta}{\int_0^{\pi/2}|F_{\nu\mu}(\theta)|^2\sin^3\theta\cos\theta d\theta}} = \frac{2w}{\sqrt{\nu+2\mu-1}} \quad (8)$$

where $\lambda$ represents the wavelength of the test light, and $|F_{\nu\mu}(\theta)|^2$ represents the far-field intensity distribution.

Therefore, the mode field diameter that is defined as the spot size can be calculated by substituting a far-field intensity distribution, which was measured by fixing the angle $\varphi$ in the circumferential direction at an arbitrary constant value, into Equation (9) below.

[Math. 9]

$$MFD = \sqrt{\nu+2\mu-1}\frac{\lambda}{\pi}\sqrt{2\frac{\int_0^{\pi/2}|F_{\nu\mu}(\theta)|^2\sin\theta\cos\theta d\theta}{\int_0^{\pi/2}|F_{\nu\mu}(\theta)|^2\sin^3\theta\cos\theta d\theta}} \quad (9)$$

Moreover, by substituting Equation (5) into definition equations of Petermann I and Petermann II (see, Equation (8) in Non-Patent Document 5 and Equation (3) in Non-Patent Document 6, respectively) used conventionally for calculating the mode field diameter of a single-mode fiber from the electric field distribution in the near field, the following relational equations are obtained.

[Math. 10]

$$2\sqrt{2}\left[\frac{\int_0^\infty E_{\nu\mu}^2(r)r^3 dr}{\int_0^\infty E_{\nu\mu}^2(r)r dr}\right]^{1/2} = 2w\sqrt{\nu+2\mu-1} \quad (10)$$

[Math. 11]

$$2\sqrt{2}\left[\frac{\int_0^\infty E_{\nu\mu}^2(r)r dr}{\int_0^\infty \left\{\frac{dE_{\nu\mu}(r)}{dr}\right\}^2 r dr}\right]^{1/2} = \frac{2w}{\sqrt{2\mu-1}} \quad (11)$$

Here, the electric field distribution in the near field can be calculated from the electric field distribution in the far field using the following equation (see, for example, Equation (6) in Non-Patent Literature 3).

[Math. 12]

$$E_{\nu\mu}(r) = \frac{k^2}{2}\int_0^\infty F_{\nu\mu}(\theta)J_\nu(kr\sin\theta)\sin(2\theta)d\theta \quad (12)$$

Therefore, the mode field diameter that is defined as the spot size can also be calculated by substituting the far-field intensity distribution, which was measured by fixing the angle $\varphi$ in the circumferential direction at an arbitrary constant value, into Equation (12) to calculate the electric field distribution in the near field, and further substituting the electric field distribution in the near field into Equation (13) or Equation (14) below.

[Math. 13]

$$MFD = \frac{2\sqrt{2}}{\sqrt{\nu+2\mu-1}}\left[\frac{\int_0^\infty E_{\nu\mu}^2(r)r^3 dr}{\int_0^\infty E_{\nu\mu}^2(r)r dr}\right]^{1/2} \quad (13)$$

[Math. 14]

$$MFD = 2\sqrt{2(2\mu-1)}\left[\frac{\int_0^\infty E_{\nu\mu}^2(r)r dr}{\int_0^\infty \left\{\frac{dE_{\nu\mu}(r)}{dr}\right\}^2 r dr}\right]^{1/2} \quad (14)$$

Example 1

Numerical calculations were performed to confirm the validity of Equations (9), (13) and (14).

Figure 3:
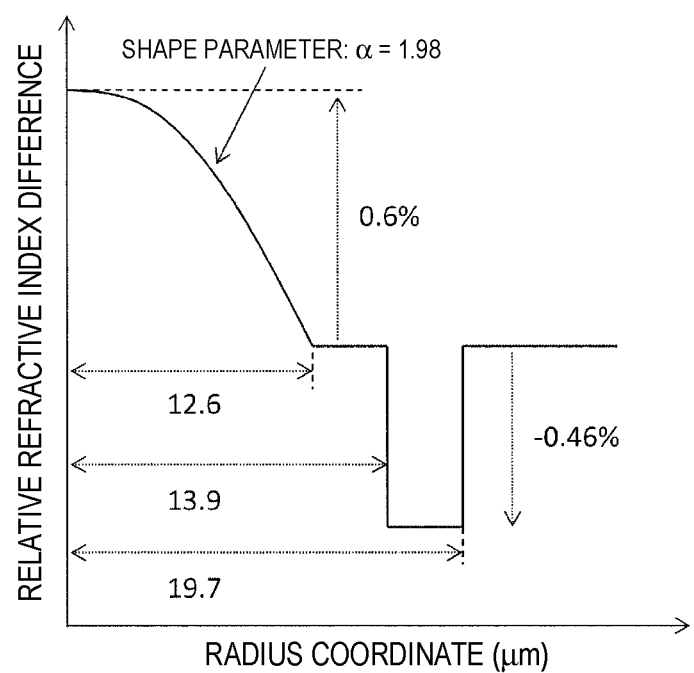
FIG. 3 is a diagram explaining a refractive index distribution.

FIG. 3 is a diagram explaining the refractive index profile of an optical fiber used for the numerical calculations (optical fiber under test). The optical fiber under test had a graded index core having a shape parameter $\alpha$ of 1.98, and a low refractive index layer. Parameters of the core diameter, the relative refractive index difference, etc. are as shown in FIG. 3.

Figure 4:
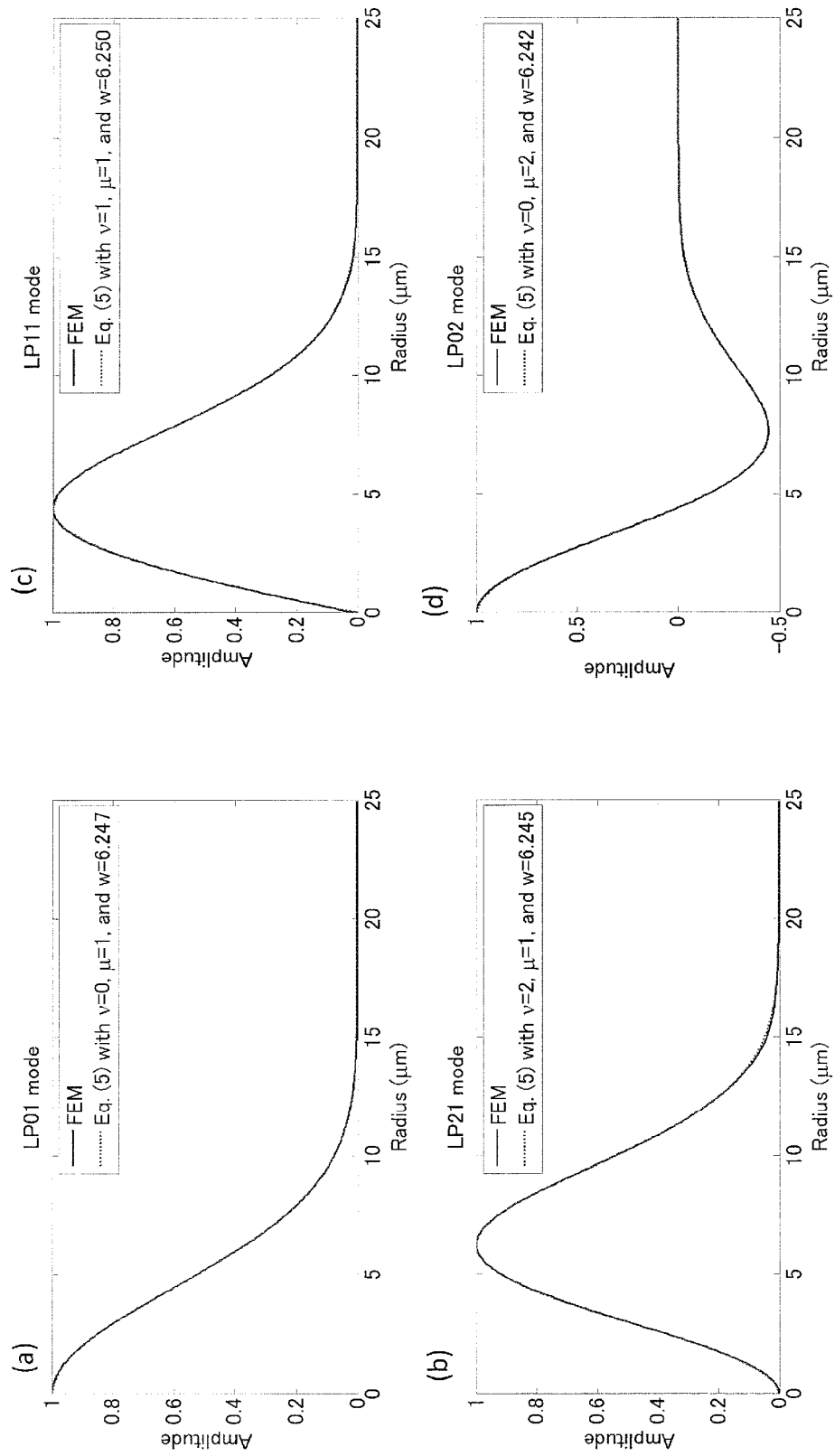
FIG. 4 shows electric field distributions in the near field.

FIG. 4 shows the electric field distribution in the near field of the above-mentioned optical fiber. The solid line represents the result of calculations using a finite element method (FEM). The result in FIG. 4 was standardized so that the maximum value of the electric field was 1. The dotted line represents the result obtained by substituting w, which maximizes the value given by Equation (15) below, into Equation (5).

[Math. 15]

$$I = \frac{\int_0^\infty g_{\nu\mu-FEM}(r)E_{\nu\mu}(r)r dr}{\sqrt{\int_0^\infty g_{\nu\mu-FEM}^2(r)r dr \int_0^\infty E_{\nu\mu}^2(r)r dr}} \quad (15)$$

Here, $g_{\nu\mu-FEM}(r)$ is the electric field distribution of the $LP_{\nu\mu}$ mode calculated using the FEM. That is, the dotted line represents the result of approximating the electric field distribution calculated using the FEM by a higher-order Gaussian mode, and a value that is twice of w used for obtaining this result is a mode field diameter defined as a spot size to be obtained this time, and is a reference value for comparison.

Figure 5:
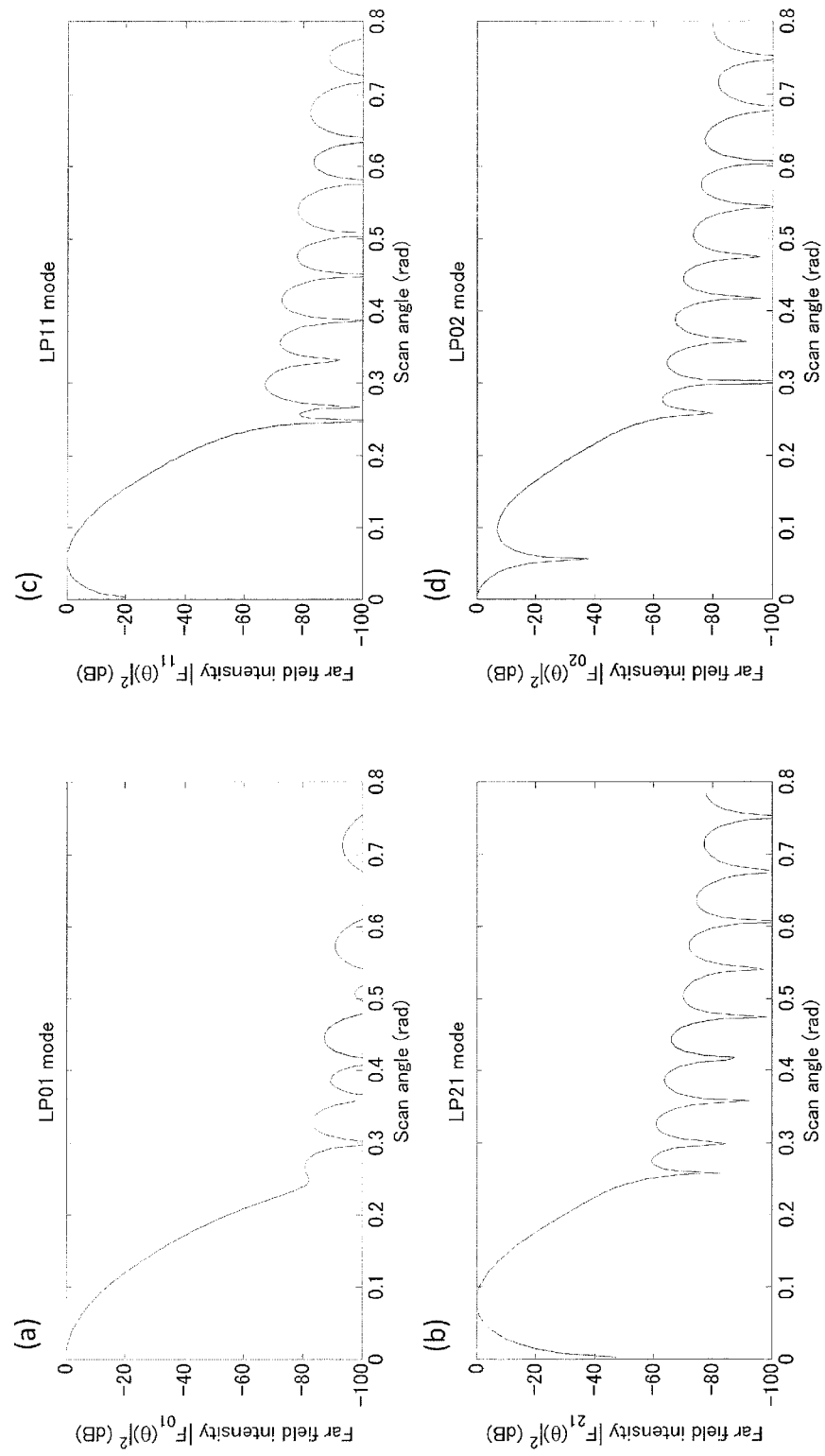
FIG. 5 shows far-field patterns.

FIG. 5 shows far-field patterns represented by the square of the absolute value of the electric field distribution in the far field obtained by substituting the result represented by the solid line in FIG. 4 into Equation (7).

Figures 6, 7:
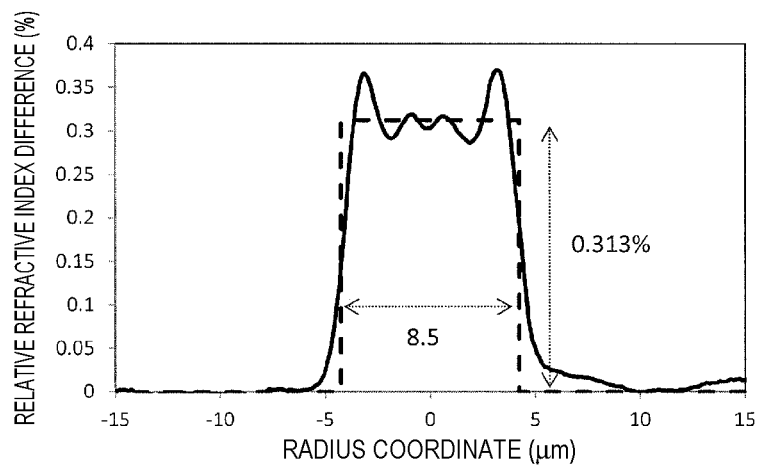
FIG. 6 shows the summarized results of calculated mode field diameters.
FIG. 7 shows a refractive index distribution.

FIG. 6 is a table collectively showing the above-mentioned reference value, the mode field diameter calculated by substituting the result represented by the solid line in FIG. 4 into Equations (13) and (14), and the mode field diameter calculated by substituting the result in FIG. 5 into Equation (9). It can be understood that the mode field diameters calculated by either of Equations agree well with the reference value.

Thus, it was confirmed that a desired mode field diameter can be obtained using any one of Equations (13), (14) and (9).

Example 2

In order to confirm the validity of Equations (9), (13) and (14), the mode field diameter of the optical fiber operating in a 2LP mode was measured and compared with the result obtained by numerical calculation.

FIG. 7 shows the refractive index distribution of the optical fiber used for the measurement. The solid line represents the measurement result. The broken line represents the result of approximation by an ideal step-type refractive index distribution for calculation.

Figure 8:
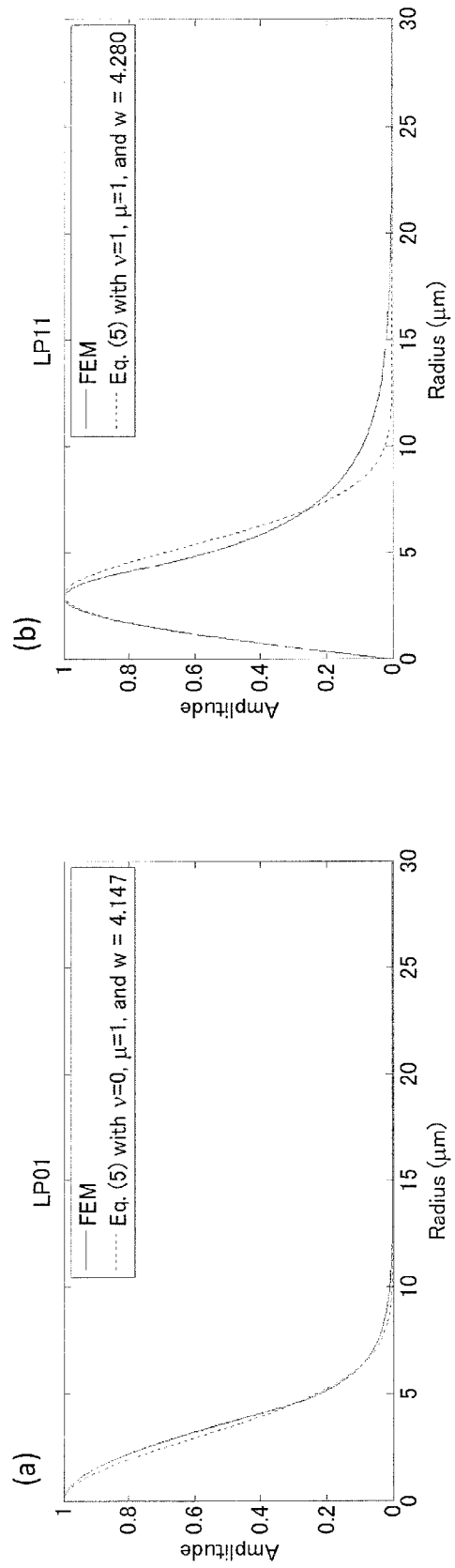
FIG. 8 shows electric field distributions in the near field.

FIG. 8 shows electric field distributions in the near field. The solid line represents the result of calculation using the FEM, based on the broken line in FIG. 7. The dotted line represents the result of approximating the electric field distribution, which was calculated using the FEM, by a higher-order Gaussian mode, and a value that is twice of w used to obtain this result is a mode field diameter defined as a spot size to be obtained this time, and is a reference value for comparison.

Figures 9, 10:
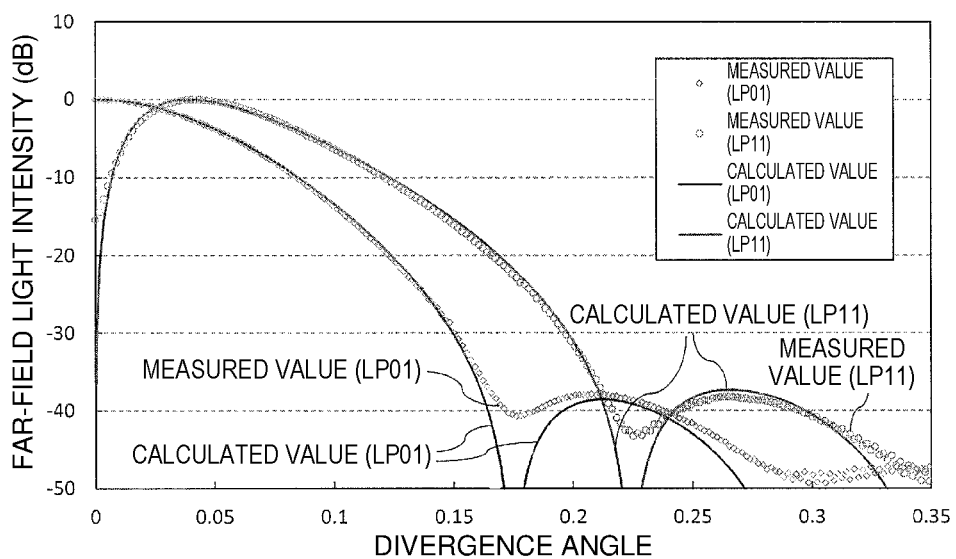
FIG. 9 shows far-field patterns.
FIG. 10 shows the summarized results of calculated mode field diameters.

FIG. 9 shows far-field patterns. Plots represent measured values, and a solid line represents a far-field pattern expressed by the square of the absolute value of an electric field distribution in a far field obtained by substituting a solid line in FIG. 8 into Equation (7). The measured values agree well with the results predicted by numerical calculations.

FIG. 10 is a table collectively showing the above-mentioned reference value, and the mode field diameter calculated by substituting the result in FIG. 9 into Equation (9). It can be understood that the mode field diameter calculated by Equation (9) agrees well with the reference value.

Thus, it was confirmed that a desired mode field diameter can be obtained using Equation (9).

The following supplements the derivation process of Equation (10).

The numerator on the left side of Equation (10) is expressed by the following equation.

[Math. 10-1]

$$\int_0^\infty \frac{2(\mu-1)!}{\pi(\nu+\mu-1)!} \left(\frac{2r^2}{w^2}\right)^\nu \frac{1}{w^2} \left[L_{\mu-1}^\nu\left(\frac{2r^2}{w^2}\right)\right]^2 \exp\left(-\frac{2r^2}{w^2}\right) r^3 dr =$$

$$\frac{2(\mu-1)!}{\pi(\nu+\mu-1)!} \frac{w^2}{8} \int_0^\infty x^{\nu+1} \left[L_{p-1}^\nu(x)\right]^2 \exp(-x) dx =$$

$$\frac{2(\mu-1)!}{\pi(\nu+\mu-1)!} \frac{w^2}{8} \frac{(\nu+\mu-1)!}{(\mu-1)!}(\nu+2\mu-1) = \frac{w^2}{4\pi}(\nu+2\mu-1)$$

[Math. 10-2]

where $$x = \frac{2r^2}{w^2}$$

The denominator on the left side of Equation (10) is expressed by the following Equation.

[Math. 10-3]

$$\int_0^\infty \frac{2(\mu-1)!}{\pi(\nu+\mu-1)!} \left(\frac{2r^2}{w^2}\right)^\nu \frac{1}{w^2} \left[L_{\mu-1}^\nu\left(\frac{2r^2}{w^2}\right)\right]^2 \exp\left(-\frac{2r^2}{w^2}\right) r dr =$$

$$\frac{2(\mu-1)!}{\pi(\nu+\mu-1)!} \frac{1}{4} \int_0^\infty x^\nu \left[L_{p-1}^\nu(x)\right]^2 \exp(-x) dx =$$

-continued $$\frac{2(\mu-1)!}{\pi(\nu+\mu-1)!} \frac{1}{4} \frac{(\nu+\mu-1)!}{(\mu-1)!} = \frac{1}{2\pi}$$

Thus, Equation (10) can be mathematically derived.

For Equation (8), let $$\rho = k \sin \theta \qquad \text{[Math. 8-1]}$$

then the equation can be rewritten as follows.

[Math. 8-2]

$$\frac{\lambda}{\pi} \sqrt{2 \frac{\int_0^{\pi/2} |F_{\nu\mu}(\theta)|^2 \sin\theta\cos\theta d\theta}{\int_0^{\pi/2} |F_{\nu\mu}(\theta)|^2 \sin^3\theta\cos\theta d\theta}} = 2\sqrt{2} \left[\frac{\int_0^\infty F_{\nu\mu}^2(\rho)\rho d\rho}{\int_0^\infty F_{\nu\mu}^2(\rho)\rho^3 d\rho}\right]^{1/2}$$

Therefore, Equation (8) can be derived by performing arithmetic operations similar to Equation (10).

On the other hand, Equation (11) was derived using numerical analysis. More specifically, the relationship among w, ν, and μ was understood from the values obtained by:

step 1: specifying w, ν, and μ and substituting w, ν, and μ into Equation (5);

step 2: substituting the electric field distribution of Equation (5) into the left side of Equation (11); and step 3: changing w, ν, and μ and repeating steps 1 and 2.

Consequently, Equation (11) was obtained.

Another Embodiment

The present invention is not limited to the above-described embodiment, and can be implemented in various modified forms without departing from the scope of the gist of the invention. In short, this invention is not limited precisely to the above-described embodiment, and can be embodied by modifying the components in the implementation stage without departing from the scope of the gist.

Moreover, various inventions can be made by suitably combining a plurality of the components disclosed in the above-described embodiment. For example, some of the components may be omitted from the entire components described in the embodiment. Furthermore, components of different embodiments may be suitably combined.

INDUSTRIAL APPLICABILITY

The present disclosure is applicable to information and communication industries.

REFERENCE SIGNS LIST

10: optical fiber under test
11: light source
12: mode converter
13: alignment device
14: rotation stage 14
15: optical receiver
16: control unit
17: A/D converter
18: signal processing unit

The invention claimed is:

1. A mode field diameter test device comprising:
    test light incidence means for selectively causing test light to be incident in a mode subject to measurement, on one end of an optical fiber under test;
    far-field pattern measurement means for measuring a far-field pattern of the mode subject to measurement, with respect to a divergence angle θ at the other end of the optical fiber under test, by a far-field scanning technique; and
    mode field diameter calculation means for calculating, using a first equation, a mode field diameter from information about incident mode orders in the optical fiber under test by the test light incidence means and the far-field pattern measured by the far-field pattern measurement procedure, or mode field diameter calculation means for calculating an electric field distribution in a near field from the far-field pattern and further calculating a mode field diameter using a second or third equation;
    wherein the first equation is Equation (C4),

[Math. C4]

$$MFD = \sqrt{v+2\mu-1}\frac{\lambda}{\pi}\sqrt{2\frac{\int_0^{\pi/2}|F_{v\mu}(\theta)|^2\sin\theta\cos\theta d\theta}{\int_0^{\pi/2}|F_{v\mu}(\theta)|^2\sin^3\theta\cos\theta d\theta}} \quad (C4)$$

where $v$ is the order in a circumferential direction, $\mu$ is the order in a radial direction, $\lambda$ represents a wavelength of the test light, $\theta$ is the divergence angle, $F_{v\mu}(\theta)$ is an electric field distribution in a far field, and $|F_{v\mu}(\theta)|^2$ represents the far-field pattern.

2. A mode field diameter test device comprising:
    test light incidence means for selectively causing test light to be incident in a mode subject to measurement, on one end of an optical fiber under test;
    far-field pattern measurement means for measuring a far-field pattern of the mode subject to measurement, with respect to a divergence angle θ at the other end of the optical fiber under test, by a far-field scanning technique; and
    mode field diameter calculation means for calculating, using a first equation, a mode field diameter from information about incident mode orders in the optical fiber under test by the test light incidence means and the far-field pattern measured by the far-field pattern measurement procedure, or mode field diameter calculation means for calculating an electric field distribution in a near field from the far-field pattern and further calculating a mode field diameter using a second or third equation;
    wherein the second equation is Equation (C5),

[Math. C5]

$$MFD = \frac{2\sqrt{2}}{\sqrt{v+2\mu-1}}\left[\frac{\int_0^\infty E_{v\mu}^2(r)r^3 dr}{\int_0^\infty E_{v\mu}^2(r)r dr}\right]^{1/2} \quad (C5)$$

where $v$ is the order in a circumferential direction, $\mu$ is the order in a radial direction, r is a radial coordinate in a cross section of the optical fiber, and $E_{v\mu}(r)$ is the electric field distribution of an $LP_{v\mu}$ mode in the near field.

3. A mode field diameter test device comprising:
    test light incidence means for selectively causing test light to be incident in a mode subject to measurement, on one end of an optical fiber under test;
    far-field pattern measurement means for measuring a far-field pattern of the mode subject to measurement, with respect to a divergence angle θ at the other end of the optical fiber under test, by a far-field scanning technique; and
    mode field diameter calculation means for calculating, using a first equation, a mode field diameter from information about incident mode orders in the optical fiber under test by the test light incidence means and the far-field pattern measured by the far-field pattern measurement procedure, or mode field diameter calculation means for calculating an electric field distribution in a near field from the far-field pattern and further calculating a mode field diameter using a second or third equation;
    wherein the second equation is Equation (C6),

[Math. C6]

$$MFD = 2\sqrt{2(2\mu-1)}\left[\frac{\int_0^\infty E_{v\mu}^2(r)r dr}{\int_0^\infty \left\{\frac{dE_{v\mu}(r)}{dr}\right\}^2 r dr}\right]^{1/2} \quad (C6)$$

where $v$ is the order in a circumferential direction, $\mu$ is the order in a radial direction, r is a radial coordinate in a cross section of the optical fiber, and $E_{v\mu}(r)$ is the electric field distribution of an $LP_{v\mu}$ mode in the near field.

* * * * *